(12) United States Patent
Sanda

(10) Patent No.: US 8,027,303 B2
(45) Date of Patent: Sep. 27, 2011

(54) WIRELESS COMMUNICATION SYSTEM

(75) Inventor: Takako Sanda, Sagamihara (JP)

(73) Assignee: Nokia Corporation, Espoo (FI)

( * ) Notice: Subject to any disclaimer, the term of this patent is extended or adjusted under 35 U.S.C. 154(b) by 1160 days.

(21) Appl. No.: 11/008,833

(22) Filed: Dec. 10, 2004
(Under 37 CFR 1.47)

(65) Prior Publication Data
US 2006/0013174 A1    Jan. 19, 2006

(51) Int. Cl.
*H04W 4/00*    (2009.01)
*H04W 36/00*    (2009.01)

(52) U.S. Cl. .................. 370/331; 455/436; 455/442

(58) Field of Classification Search .............. 370/338, 370/331
See application file for complete search history.

(56) References Cited

U.S. PATENT DOCUMENTS

| | | | |
|---|---|---|---|
| 5,212,806 A | 5/1993 | Natarajan | |
| 5,325,362 A * | 6/1994 | Aziz | 370/405 |
| 6,466,964 B1 * | 10/2002 | Leung et al. | 709/202 |
| 7,184,418 B1 * | 2/2007 | Baba et al. | 370/331 |
| 7,286,671 B2 * | 10/2007 | Yegin et al. | 380/270 |
| 7,369,522 B1 * | 5/2008 | Soininen et al. | 370/328 |
| 7,609,668 B1 * | 10/2009 | Smith | 370/328 |
| 2002/0049059 A1 * | 4/2002 | Soininen et al. | 455/439 |
| 2003/0087646 A1 * | 5/2003 | Funato et al. | 455/456 |
| 2003/0104814 A1 | 6/2003 | Gwon et al. | 455/436 |
| 2003/0125027 A1 * | 7/2003 | Gwon et al. | 455/436 |
| 2003/0214922 A1 * | 11/2003 | Shahrier | 370/331 |
| 2003/0224758 A1 * | 12/2003 | O'Neill et al. | 455/411 |
| 2003/0224788 A1 * | 12/2003 | Leung et al. | 455/435.1 |
| 2007/0104143 A1 * | 5/2007 | Hori | 370/331 |
| 2008/0151808 A1 * | 6/2008 | O'Neill | 370/312 |

FOREIGN PATENT DOCUMENTS

| | | | |
|---|---|---|---|
| JP | 2002-64544 | * | 2/2002 |
| JP | 2002-64544 A | | 2/2002 |

OTHER PUBLICATIONS

Dommety et al: "Fast Handovers for Mobile IPv6; draft-ietf-mobileip-fast-mipv6-03.txt", IETF Standard-Working-draft, Internet Engineering Task Force, IETF, CH, vol. mobileip, No. 3, Jul. 1, 2001, XP015023337, ISSN: 0000-0004, (pp. 1-67).
Kempf, et al: "Bidirectional Edge Tunnel Handover for IPv6; draft-kempf-beth-ipv6-00.txt", IETF Standard-Working Draft, Internet Engineering Task Force, IETF, CH, Jun. 1, 2001, XP015030818, ISSN:0000-0004, (pp. 1-35).
Kempf et al: "Bidirectional Edge Tunnel Handover for IPv6; draft-kempf-beth-ipv6-02.txt", IETF Standard-working-Draft, Internet Engineering Task Force, IETF, CH, No. 2, Sep. 1, 2001, XP015030820, ISSN: 0000-0004, (pp. 1-29).
"Low Latency Mobile Triggered Post Registration Tunneling Handoff Scheme for Mobile IPv4 and Mobile IPv6", U.S. Appl. No. 60/334,481, filed Nov. 30, 2001, 12 pgs.
"Proactive Source Triggering Post Mobile Initiated Tunneling Handoff", U.S. Appl. No. 60/343,491, filed Dec. 21, 2001, 5 pgs.

* cited by examiner

*Primary Examiner* — Patrick Edouard
*Assistant Examiner* — Huy Ho
(74) *Attorney, Agent, or Firm* — Harrington & Smith

(57) ABSTRACT

A mobile node (MN) 100 selects an AP 302 in a subnetwork 300 as the next AP to which it is wirelessly connected, while it is present within a cell 203 corresponding to a subnetwork 200 and wirelessly connected to an AP 202 in the subnetwork 200. The MN 100 transmits data indicating a request for BETH and the next AP to which it is wirelessly connected to an AR 201 via L3 level communication, while the MN 100 is present within the cell 203. The AR 201 implements establishment of a BET between an AR 301 in the subnetwork 300 and itself. As a result, the MN 100 can still use a care of address adapted to the subnetwork 200 even after it is wirelessly connected to the subnetwork 300.

25 Claims, 7 Drawing Sheets

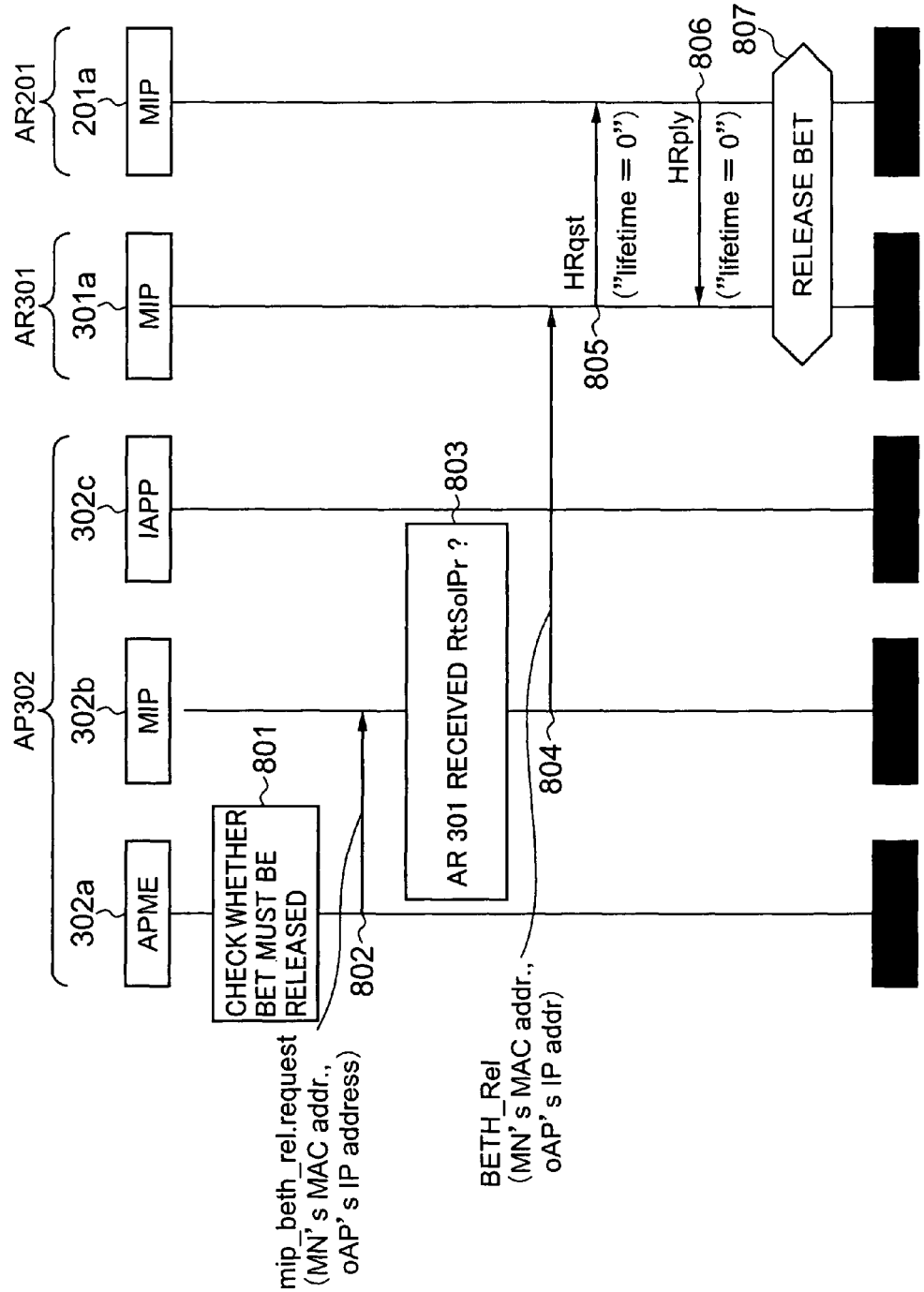

WIRELESS COMMUNICATION SYSTEM

BACKGROUND OF THE INVENTION (i) Field of the Invention

This invention relates to a wireless communication system using a wireless LAN (wireless local area network), particularly to a wireless communication system based on IEEE802.11 which is a standard for a wireless LAN and Mobile IPv6 which is a next-generation Internet protocol.

(ii) Description of the Related Art

As a wireless communication system using a wireless LAN, a wireless communication system using Mobile IPv6 which is a next-generation Internet protocol has been becoming increasingly popular. The wireless communication system using Mobile IPv6 will be described with reference to FIG. 1. A wireless communication system shown in FIG. 1 comprises a plurality of subnetworks, i.e., a subnetwork 20 and a subnetwork 30 in this case, and a mobile node (MN) which is connectable to any of the subnetworks, i.e., an MN 10 in this case.

The subnetwork 20 comprises an access router (AR) 21 which handles routing of packet data and an access point (AP) 22 which is connected to the AR 21 so as to form a specific communicatable range (cell) 23 and perform wireless communication with the MN 10 which is present within the cell 23. The AR 21 is connected to an AR in each of subnetworks adjacent to the subnetwork 20. The subnetwork 30 has a similar constitution to that of the subnetwork 20.

In such a wireless communication system, the MN 10 present within the cell 23 can transmit or receive packet data by acquiring an IP address adapted to the subnetwork 20, i.e., a care of address, from the AR 21 via wireless communication with the AP 22. Thereby, packet data transmitted from a given transmitter to the MN 10 is passed to the MN 10 via the AR 21 and the AP 22 based on the care of address of the MN 10, while packet data transmitted from the MN 10 to a desired receiver is passed to the desired receiver via the AP 22 and the AR 21.

The wireless communication system using Mobile IPv6 shown in FIG. 1 provides wireless communication assuming that an MN moves from a range corresponding to a cell to a range corresponding to another cell. To implement wireless communication smoothly even if the MN makes such a movement, the wireless communication system using Mobile IPv6 employs a BETH (Bi-directional Edge Tunnel Handover) technique in particular among Fast Handover (FHO) Techniques. The BETH will be described with reference to an exemplary case where the MN 10 moves from a point A in the cell 23 to a point B in a cell 33.

Before the MN 10 moves from the point A to the point B, the AR 21 notifies the AR 31 that the MN 10 will move into the cell 33. Thereby, a tunnel or BET (Bi-directional Edge Tunnel) is established between the AR 21 and the AR 31.

In order for the MN 10 to connect to the subnetwork 30 and implement wireless communication after moving into the cell 33, it must basically newly acquire a care of address adapted to the subnetwork 30. However, since the BET is established between the AR 21 and the AR 31, packet data transmitted to the MN 10 is passed from the AR 21 to the AR 31 via the BET first and then passed to the MN 10 via the AP 32, even before the MN 10 acquires the new care of address. Meanwhile, packet data transmitted from the MN 10 to a desired receiver is passed to the AR 31 via the AP 32 first, then passed from the AR 31 to the AR 21 via the BET, and then passed to the desired receiver.

Then, after the MN 10 acquires the new care of address adapted to the subnetwork 30 from the AR 31 via wireless communication with the AP 32, it transmits or receives packet data by use of the new care of address.

In such BETH as described above, it is intended that transmission and reception of packet data can be implemented smoothly even when the MN 10 has moved from the cell 23 to the cell 33.

However, the above wireless communication system using Mobile IPv6 has the following problem.

That is, firstly, in the wireless communication system shown in FIG. 1, Mobile IPv6 is used as a protocol between the MN and the AR, and IEEE802.11 which is a standard associated with a wireless LAN is generally used as a protocol between the MN and the AP.

In the Mobile IPv6 specification, it is described with respect to handover that a network or AR indicates an MN a subnetwork for handover. That is, network-based handover is supported in Mobile IPv6. Meanwhile, it is described in the IEEE802.11 specification that an MN determines a subnetwork for handover by itself. That is, MN-based handover is supported in IEEE802.11.

Therefore, when IEEE802.11 is used between the MN and the AP in the wireless communication system shown in FIG. 1 in the above example, the MN 10 does handover to the subnetwork 30 that it has determined by itself, without providing any notification to the AR 21 of the subnetwork 20 to which the MN 10 has been connected. As a result, since the AR 21 of the subnetwork 20 cannot know that the MN 10 does handover to the subnetwork 30, the AR 21 cannot establish a BET between the AR 31 and itself.

To solve the problem, it is conceivable that the AP notifies the MN of a subnetwork for handover by itself. However, as described above, IEEE802.11 is used between the MN and the AP, and a signal used by the AP to give such a notification to the MN is not defined in the IEEE802.11. Further, the specification of the IEEE802.11 has already been set in 1,999 and spread all over the world. Accordingly, it is impossible to alter the contents of the specification of the IEEE802.11 at the present time.

SUMMARY OF THE INVENTION

An object of the present invention is to achieve BETH in a wireless communication system comprising a combination of Mobile IPv6 and IEEE802.11.

(1) A characteristic of the wireless communication system according to the present invention is that it comprises a plurality of subnetworks, each subnetwork comprises intermediary means for forming a communicatable range which allows wireless communication therewithin and performing wireless communication with a mobile communication terminal existing in the communicatable range and routing means for connecting to the intermediary means and handling routing of a data signal between a mobile communication terminal which is wirelessly connected to the intermediary means and a communication network, and routing means in the current subnetwork out of the subnetworks acknowledges the next subnetwork to which a mobile communication terminal that is present in the communicatable range of the intermediary means of the current subnetwork and wirelessly connected to the current subnetwork is wirelessly connected, from the mobile communication terminal via layer 3 (L3) level communication and implements establishment of a BET to the routing means of the above next subnetwork.

(2) In one embodiment of the wireless communication system according to the present invention, the routing means of the above current subnetwork implements the establishment of the BET after the above mobile communication terminal determines the above next subnetwork and while the mobile communication terminal is in connection with the routing means of the above current subnetwork.

(3) In another embodiment of the wireless communication system according to the present invention, the routing means of the above current subnetwork implements the establishment of the BET after the above mobile communication terminal determines the above next subnetwork and before the mobile communication terminal is connected to the intermediary means of the next subnetwork.

(4) In still another embodiment of the wireless communication system according to the present invention, the routing means of the above current subnetwork notifies the intermediary means of the current subnetwork of the status of the establishment of the BET.

(5) In still another embodiment of the wireless communication system according to the present invention, the routing means of the above current subnetwork implements FHO when it cannot establish the BET.

(6) In still another embodiment of the wireless communication system according to the present invention, the intermediary means of the current subnetwork notifies the intermediary means of the above next subnetwork of the status of the establishment of the BET implemented by the routing means of the current subnetwork and an IP address adapted to the current subnetwork of the mobile communication terminal, and the intermediary means of the next subnetwork notifies the mobile communication terminal of the status of the establishment of the BET by use of the IP address.

(7) In still another embodiment of the wireless communication system according to the present invention, when the routing means of the above current subnetwork has a BET established between the routing means of the last subnetwork to which the above mobile communication terminal has been wirelessly connected and itself, the routing means of the above current subnetwork directs the routing means of the next subnetwork to establish a BET between the routing means of the next subnetwork and the routing means of the last subnetwork, in place of establishing a BET between the routing means of the next subnetwork and itself.

(8) In still another embodiment of the wireless communication system according to the present invention, the above intermediary means has determination means for determining whether the BET established by the routing means connected to the intermediary means is to be released, and the routing means connected to the intermediary means releases the established BET according to the result of the determination.

(9) In still another embodiment of the wireless communication system according to the present invention, the above subnetwork is connected to another subnetwork by connecting the routing means of the subnetwork to the routing means of another subnetwork by a wire.

(10) A characteristic of the mobile communication terminal according to the present invention is that it is wirelessly connected to any subnetwork in a wireless communication system, the wireless communication system comprises a plurality of subnetworks, each subnetwork comprises intermediary means for forming a communicatable range which allows wireless communication therewithin and performing wireless communication with a mobile communication terminal present in the communicatable range, and routing means for connecting to the intermediary means and handling routing of a data signal between a mobile communication terminal which is wirelessly connected to the intermediary means and a communication network, the routing means of a subnetwork establishes a BET between the routing means of another subnetwork and itself in response to a request from the mobile communication terminal, and the mobile communication terminal comprises determination means for determining the next subnetwork to which the terminal is wirelessly connected while it is wirelessly connected to the current subnetwork and transmission means for transmitting data indicating the determined next subnetwork and data indicating a request for establishing a BET between the routing means of the next subnetwork and the routing means of the current subnetwork to the routing means of the current subnetwork via layer 3 level communication, while the terminal is present in the communicatable range of the intermediary means of the current subnetwork.

BRIEF DESCRIPTION OF THE DRAWINGS

FIG. 8 is a flowchart showing the operation of a wireless communication system according to an embodiment 5 of the present invention.

DETAILED DESCRIPTION OF THE PREFERRED EMBODIMENTS

Embodiment 1

Figure 1:
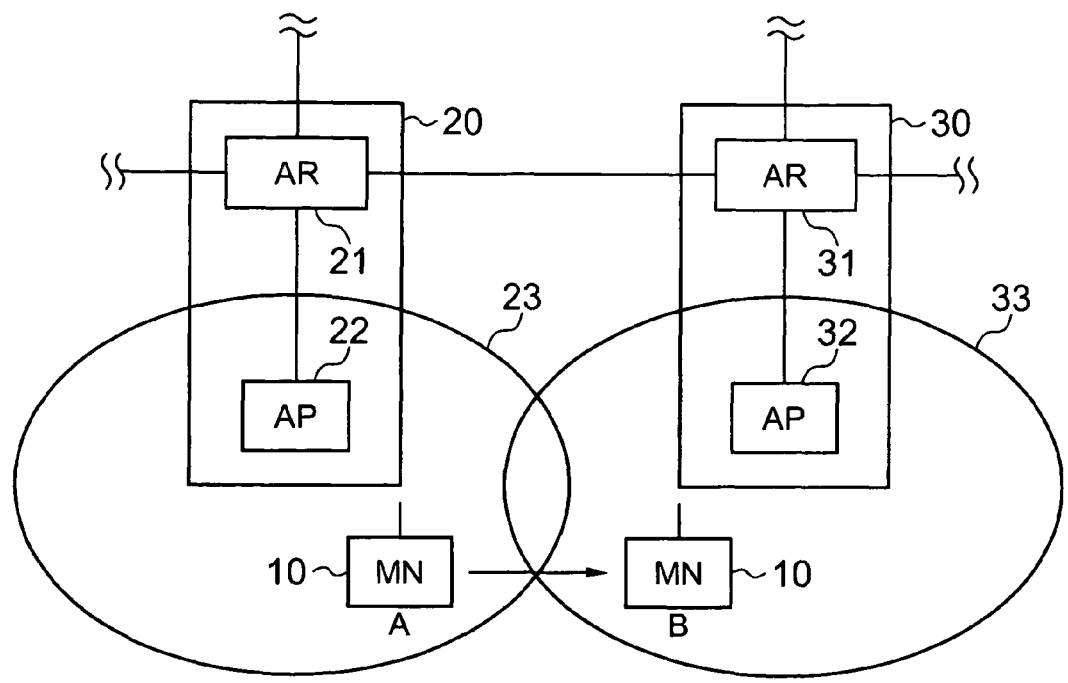
FIG. 1 is a schematic diagram showing the constitution of a wireless communication system.

In the present embodiment, a description will be given to a case where after a mobile node (MN) which is present in a given communicatable range determines the next access point (AP) to which it is to be connected, the MN requests BETH and notifies the above AP for handover by use of a signal defined in Mobile IPv6 as a signal to be transmitted from an MN to an access router (AR) while the MN is present within the communicatable range.

The present inventor has paid attention to a point that in a case where an MN is to move from a communicatable range (hereinafter referred to as "first communicatable range") to another communicatable range (hereinafter referred to as "second communicatable range"), if an AR corresponding to the first communicatable range can specify an AP corresponding to the second communicatable range after the MN determines an AP for handover and while the MN is present within the first communicatable range, a BET can be established between the AR corresponding to the first communicatable range and an AR corresponding to the second communicatable range before the MN starts to connect to the AP corresponding to the second communicatable range.

Thus, the present inventor has paid attention to a point that the MN notifies the AR corresponding to the first communicatable range of the above AP for handover by use of not a layer 2 (L2) level signal defined in IEEE802.11 but a layer 3 (L3) level signal, e.g., an L3 level signal defined in Mobile IPv6, after the MN determines the AP for handover and while the MN is present within the first communicatable range. In the most desirable embodiment, the present inventor has paid attention to a point that when the MN intends to implement FHO of the Mobile IPv6 standard, the MN adds data indicating the next AP to which the MN is connected to an L3 level RtSolPr message defined for implementing L3 level transmission to an AR and transmits the RtSolPr message while the MN is present within the first communicatable range. Thereby, the AR corresponding to the first communicatable range can establish a BET between the AR corresponding to the second communicatable range and itself before the MN is connected to the AP corresponding to the second communicatable range. Further, it becomes possible to use usual FHO even when the second communicatable range is not adapted to the BET.

That is, the gist of the present invention is that the MN in connection with the AR corresponding to the first communicatable range notifies the AR corresponding to the first communicatable range of data indicating the next AP to which the MN is wirelessly connected, i.e., data indicating the next subnetwork to which the MN is wirelessly connected, by use of an L3 level signal, after the MN determines the above next AP and while the MN is present within the first communicatable range. To achieve smoother BETH, the MN preferably gives such a notification immediately after it determines the AP for handover. Hereinafter, details of a wireless communication system according to the present embodiment will be described.

Figure 2:
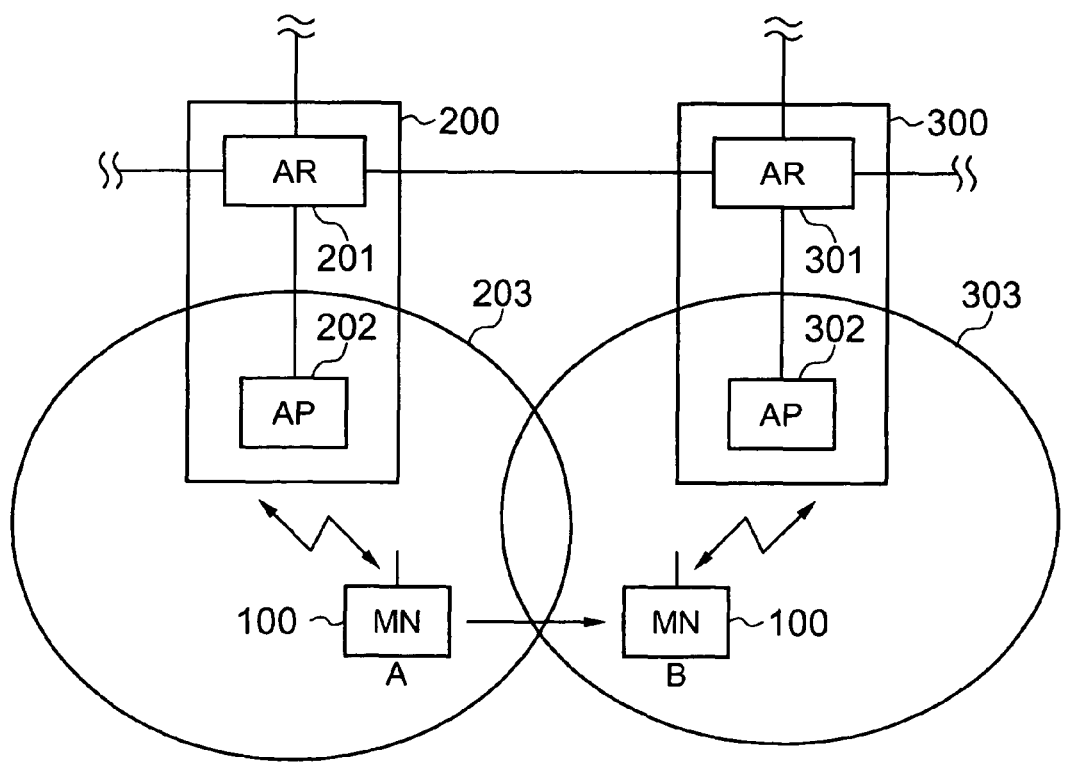
FIG. 2 is a schematic diagram showing the constitution of a wireless communication system according to an embodiment 1 of the present invention.

FIG. 2 is a schematic diagram showing the constitution of the wireless communication system according to the embodiment 1 of the present invention. The wireless communication system shown in FIG. 2 comprises a plurality of subnetworks, i.e., a subnetwork 200 and a subnetwork 300 in the present embodiment, and a mobile node (MN) which is connectable to any of these subnetworks, i.e., an MN 100 in the present embodiment.

The subnetwork 200 comprises an access router (AR) 201 which handles routing of packet data and an access point (AP) 202 which is connected to the AR 201 so as to form a communicatable range (cell) 203 and perform wireless communication with an MN (MN 100 in the present embodiment) which is present in the cell 203. This AR 201 is connected to an AR in each of subnetworks adjacent to the subnetwork 200. Thereby, the subnetwork 200 including the AR 201 is connected to communication networks (not shown) including a stationary communication network, a mobile radio communication network and the Internet. The subnetwork 300 has a similar constitution to that of the subnetwork 200.

As described above, the subnetworks are adapted to the Mobile IPv6 standard, and communication conforming to the IEEE802.11 standard is carried out between the MN and the AP.

Figure 3:
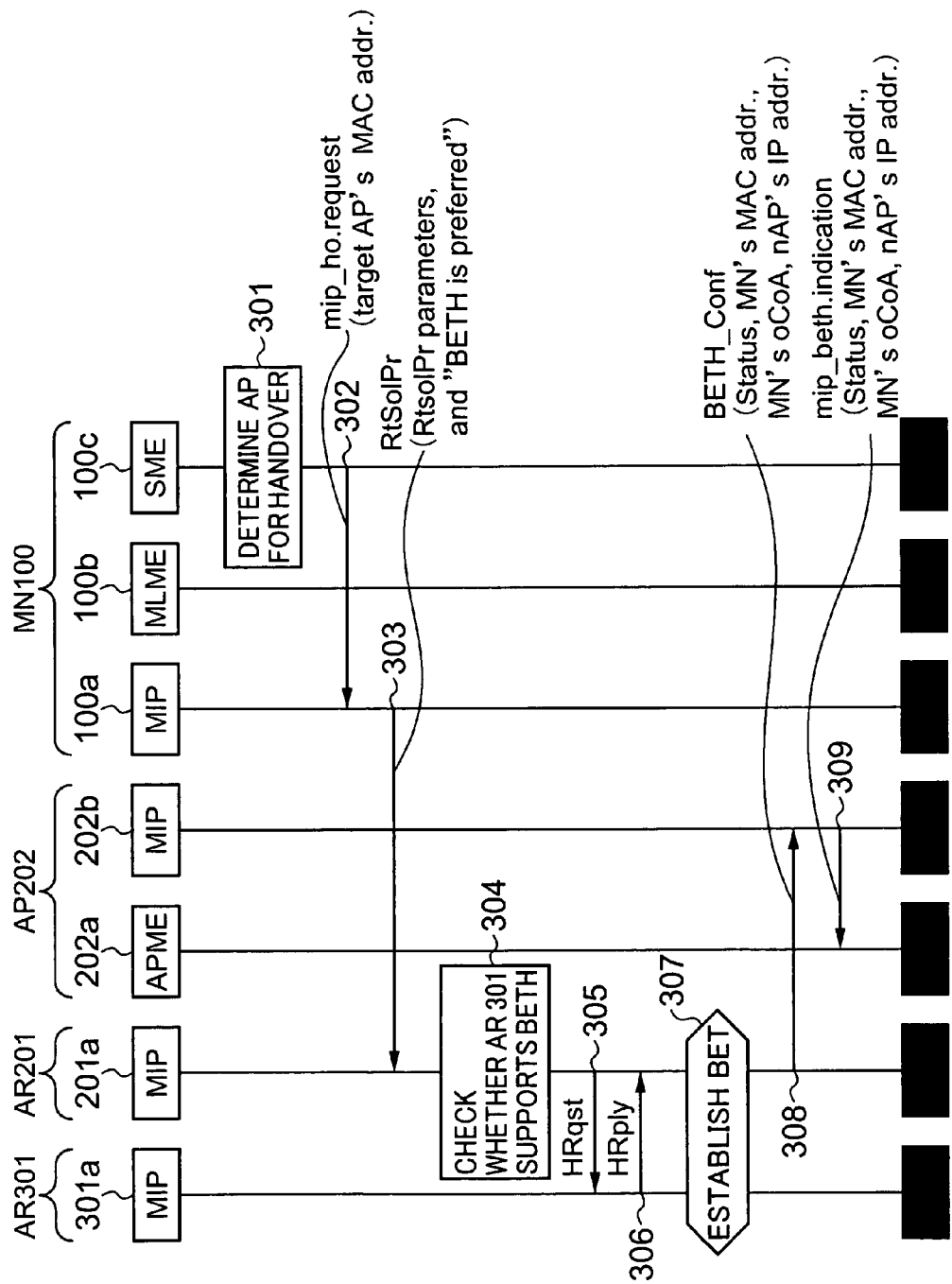
FIG. 3 is a flowchart showing the operation of the wireless communication system according to the embodiment 1 of the present invention.

Next, with reference to FIG. 3 in addition to FIG. 2, the overall operation of the wireless communication system having the above constitution will be described by use of a case where the MN 100 moves from a point A in the cell 203 to a point B in the cell 303 while having wireless communication as an example. FIG. 3 is a flowchart showing the operation of the wireless communication system according to the embodiment 1 of the present invention.

As shown in FIG. 3, the MN 100 primarily comprises, as functional elements, an MIP (Mobile IP) section 100*a* which manages data on handover of the MN 100, an MLME (Mac Layer Management Entity) section 100*b* which manages an MAC (Media Access Control) layer, and an SME (Station Management Entity) section 100*c* which manages the wireless LAN function of the MN 100.

The AP 202 primarily comprises, as functional elements, an APME (Access Point Management Entity) section 202*a* which manages the function of the AP 202, and an MIP (Mobile IP) section 202*b* which manages data on handover of the MN. The AR 201 (AR 301) primarily comprises, as a functional element, an MIP (Mobile IP) section 201*a* (301*a*) which manages data on handover of the MN.

Communication between different devices is carried out between the same functional elements of the devices. For example, communication between the AR 201 and the MN 100 is carried out between the MIP section 201*a* and the MIP section 10*a*. Further, a signal exchanged between different functional elements in the same device is referred to as "primitive".

In FIG. 2, the AP 202 and the AP 302 transmit a signal which is known to each MN, i.e., a known reference signal, periodically. When the MN 100 situated at the point A is connected to none of the subnetworks, it executes a process called "association" at first. Briefly speaking, the MN 100 executes a process called "scanning" first and determines an AP to which it is to be connected by comparing the reception intensity of a known reference signal transmitted from the AP 202 with the reception intensity of a known reference signal transmitted from the AP 302. In this case, it is assumed that the reception intensity of the known reference signal transmitted from the AP 202 is higher, and the MN 100 selects the AP 202 as an AP to which it is to be connected. Then, the MN 100 executes a process called "join" to be synchronized with the AP 202. Then, after authenticated by the AP 202, the MN 100 is connected to the subnetwork 200.

Then, the MN 100 acquires a care of address adapted to the subnetwork 200 from the AR 201 via the AP 202. In this state, packet data transmitted from the MN 100 to a desired receiver (i.e., packet data with the care of address adapted to the subnetwork 200 attached thereto) is received by the AP 202 first and then received by the desired receiver via the AR 201 and a communication network, while packet data transmitted from a given transmitter connected to the communication network to the MN 100 is passed to the AR 201 via the communication network based on the above care of address first and then passed to the MN 100 via the AP 202 through routing of the AR 201.

Next, it is assumed that the MN 100 moves from the point A toward the point B. As the MN 100 moves toward the point B, the reception intensity of the known reference signal from the AP 202 becomes lower and the reception intensity of the known reference signal from the AP 302 becomes higher. Therefore, the SME section 100*c* in the MN 100 selects the AP 302 as the next AP to which the MN 100 is wirelessly connected in STEP 301, as shown in FIG. 3. In the above description, the AP 302 and the AP 202 are assumed to belong to different access routers.

Then, in STEP 302, the SME section 100*c* transmits mip_ho.request which is a primitive indicating a request for initiation of handover to the MIP section 100*a*. This mip_ho.request includes data indicating the MAC (Media Access Control) address of the selected AP (AP 302 in this case).

Receiving the mip_ho.request, the MIP section 100a prepares an RtSolPr message which is a signal for initiating handover. The RtSolPr message is defined in Mobile IPv6 and includes various data including data indicating the MAC address of the selected AP as parameters. In the present embodiment, the message is expanded to include a parameter indicating a request for BETH ("BETH is preferred." in this case) in the RtSolPr. The thus prepared RtSolPr is transmitted from the MIP section 100a of the MN 100 to the MIP section 201a of the AR 201 in STEP 303. After transmitting the RtSolPr, the MN 100 heads toward the inside of the cell 303 (refer to FIG. 2).

If the MIP section 201a of the AR 201 which has received the RtSolPr acknowledges that the MN 100 is requesting BETH based on "BETH is preferred." included in the RtSolPr, the MIP section 201a specifies the AP (AP 302 in this case) to which the MN 100 intends to do handover based on the data indicating the MAC address of the selected AP which is included in the RtSolPr. Then, in STEP 304, the MIP section 201a checks whether an AR corresponding to the AP 302, i.e., an AR 301, supports BETH.

After confirming that the AR 301 supports BETH, the MIP section 201a transmits HRqst which is a signal indicating a request for initiation of BETH to the MIP section 301a of the AR 301 in STEP 305. The HRqst includes oCoA which is data indicating the care of address in the subnetwork 200 of the MN 100. In STEP 306, the MIP section 301a of the AR 301 transmits HRply which is a signal indicating acceptance of initiation of BETH to the MIP section 201a of the AR 201. Subsequently, in STEP 307, a BET is established between the AR 301 and the AR 201. In the present embodiment, since it is the AR 201 which is aware that the MN 100 moves from the cell 203 to the cell 303, the BET is established between the AR 201 and the AR 301 by transmission of the HRqst from the AR 201 to the AR 301. However, it is also possible that the BET is established by transmission of the HRqst from the AR 201 to the AR 301 if the AR 301 is aware of the above movement of the MN 100.

After establishment of the BET, the MIP section 201a transmits BETH_Conf which is a signal indicating successful establishment of the BET between the AR 201 and the AR 301 to the MIP section 202b of the AP 202 in STEP 308. The BETH_Conf includes, as parameters, BET Status which is data indicating the status of the BET, MN's MAC address which is data indicating the MAC address of the MN 100, MN's oCoA which is data indicating the care of address in the subnetwork 200 of the MN 100 and nAP's IP address which is data indicating the IP address of the AP 302. In this case, since the BET has been successfully established, the BET Status indicates "Successful", for example.

Receiving the BETH_Conf, the MIP section 202b transmits mip_beth.indication which is a primitive indicating data on BETH to the APME section 202a in STEP 309. The mip_beth.indication includes all parameters included in the BETH_Conf. Thereby, the AP 202 can acknowledge the establishment of the BET between the AR 201 and the AR 301 and the care of address in the subnetwork 200 of the MN 100.

After or during establishment of such BETH, the MN 100 executes "join" to be synchronized with the AP 302 of the subnetwork 300 and executes "re-association" to be connected to the subnetwork 300, as shown in FIG. 2. When the MN 100 is connected to the subnetwork 300 as described above, a BET is established between the AR 201 and the AR 301, and the MN 100 can still use the previously acquired care of address adapted to the subnetwork 200 even in the subnetwork 300. Therefore, packet data transmitted from a given transmitter to the MN 100 is passed from the AR 201 to the AR 301 via the BET first and then passed to the MN 100 via the AP 302. Meanwhile, packet data transmitted from the MN 100 to a desired receiver (i.e., packet data with the care of address adapted to the subnetwork 200 attached thereto) is passed to the AR 301 via the AP 302 first, then passed from the AR 301 to the AR 201 via the BET, and then passed to the desired receiver.

After passage of a predetermined time, the MN 100 acquires a new care of address adapted to the subnetwork 300 from the AR 301 via wireless communication with the AP 302. Thereby, the BET established between the AR 201 and the AR 301 is released. Thereafter, the MN 100 transmits or receives packet data by use of the new care of address.

Although FIG. 3 shows operations in a case where the AR 301 supports BETH, i.e., where establishment of a BET was successful, usual FHO is implemented in place of BETH if the AR 301 does not support the BETH, i.e., if establishment of the BET was failed. Although the MIP section 201a of the AR 201 transmits the above BETH_Conf (refer to STEP 308) to the MIP section 202b of the AP 202 in this case as well, Status included in the BETH_Conf indicates, for example, "failed" to indicate that the BET was not established between the AR 201 and the AR 301.

The usual FHO is implemented in the following manner. That is, if the MIP section 201a of the AR 201 acknowledges that the AR 301 does not support BETH in STEP 304, a tunnel is established between the AR 201 and the AR 301 first. Thereafter, the AR 301 allocates a care of address adapted to the subnetwork 300 to the MN 100. That is, the MN 100 acquires the new care of address adapted to the subnetwork 300 before connected to the subnetwork 300.

As described above, in the present embodiment, the MN 100 in connection with the AR 201 corresponding to the cell 203 notifies the AR 201 of data indicating a request for BETH and the next AP to which the MN 100 is wirelessly connected by use of the RtSolPr message which is an L3 level signal, after the MN 100 determines the AP 302 to which it is wirelessly connected next and while it is present within the cell 203. As a result, the AR 201 corresponding to the cell 203 can establish a BET between the AR 301 corresponding to the cell 303 and itself before the MN 100 is connected to the AP 302 corresponding to the cell 303.

Further, in the present embodiment, although the case using the RtSolPr message has been described as an example of the L3 level signal used by the MN to transmit data indicating a request for BETH and the next AP to which the MN is wirelessly connected, it is also possible to use any other signal that the MN transmits after it determines the next AP to which it is wirelessly connected and while it is present within the first communicatable range, as such an L3 level signal.

Further, in the present embodiment, the case where the MN notifies the AR in the subnetwork to which it is currently connected of data indicating the next AP to which the MN is wirelessly connected as well as a signal indicating a request for BETH via L3 level communication has been described. However, even when the MN notifies the AR of only the data indicating the next AP to which the MN is wirelessly connected via the L3 level communication, the AR in the above subnetwork can acknowledge that the MN is requesting BETH and establish a BET.

Embodiment 2

In the present embodiment, a description will be given to a case where the MN is notified that establishment of a BET was failed in the above embodiment 1.

In the example described in the embodiment 1 by use of FIG. 2, when a BET cannot be established between the AR 201 and the AR 301 due to no support for BETH by the AR 301, the MN 100 cannot be aware that the BET is not established even when it moves from the cell 203 into the cell 303. For this reason, the MN 100 assumes that the BET has been established between the AR 201 and the AR 301, resulting in problems in the operation of the MN 100. That is, for example, the MN 100 assumes that it can still use a care of address adapted to the subnetwork 200 even when it is present in the cell 303, and when the MN 100 attempts to transmit packet data to a desired receiver, it attaches the above care of address to the packet data. However, since, in reality, the BET is not established between the AR 201 and the AR 301, such packet data does not reach the above receiver.

Consequently, firstly, the present inventor has paid attention to a point that the AP 302 notifies the MN 100 that establishment of a BET was failed. However, a signal used by the AP 302 to give such a notification to the MN 100 is not defined in IEEE802.11 (the contents of this standard cannot be altered as described above) applied to between the AP 302 and the MN 100, and the AP 302 is not aware that establishment of the BET was failed between the AR 201 and the AR 301. Furthermore, to give such a notification to the MN 100, the AP 302 must know a care of address that the MN 100 has, i.e., a care of address adapted to the subnetwork 200.

Consequently, secondly, the present inventor has paid attention to use of IAPP (Inter Access Point Protocol) that is a standard associated with IEEE802.11 and a communication protocol which defines communication between APs. In this IAPP, a signal (IAPP-MOVE) used by an AP in a subnetwork (hereinafter referred to as "first AP") to notify anAP in another subnetwork (hereinafter referred to as "second AP") of data about an MN in response to a request from the second AP when the MN did handover from the first AP to the second AP is defined. This IAPP standard is currently intensely argued and can be altered. Thus, the present inventor has found that data about establishment of a BET (in the above example, data indicating whether the BET was established between the AR 201 and the AR 301) and data indicating the care of address of the MN (in the above example, data indicating the care of address adapted to the subnetwork 200 of the MN 100) are incorporated into the above signal.

Figure 4:
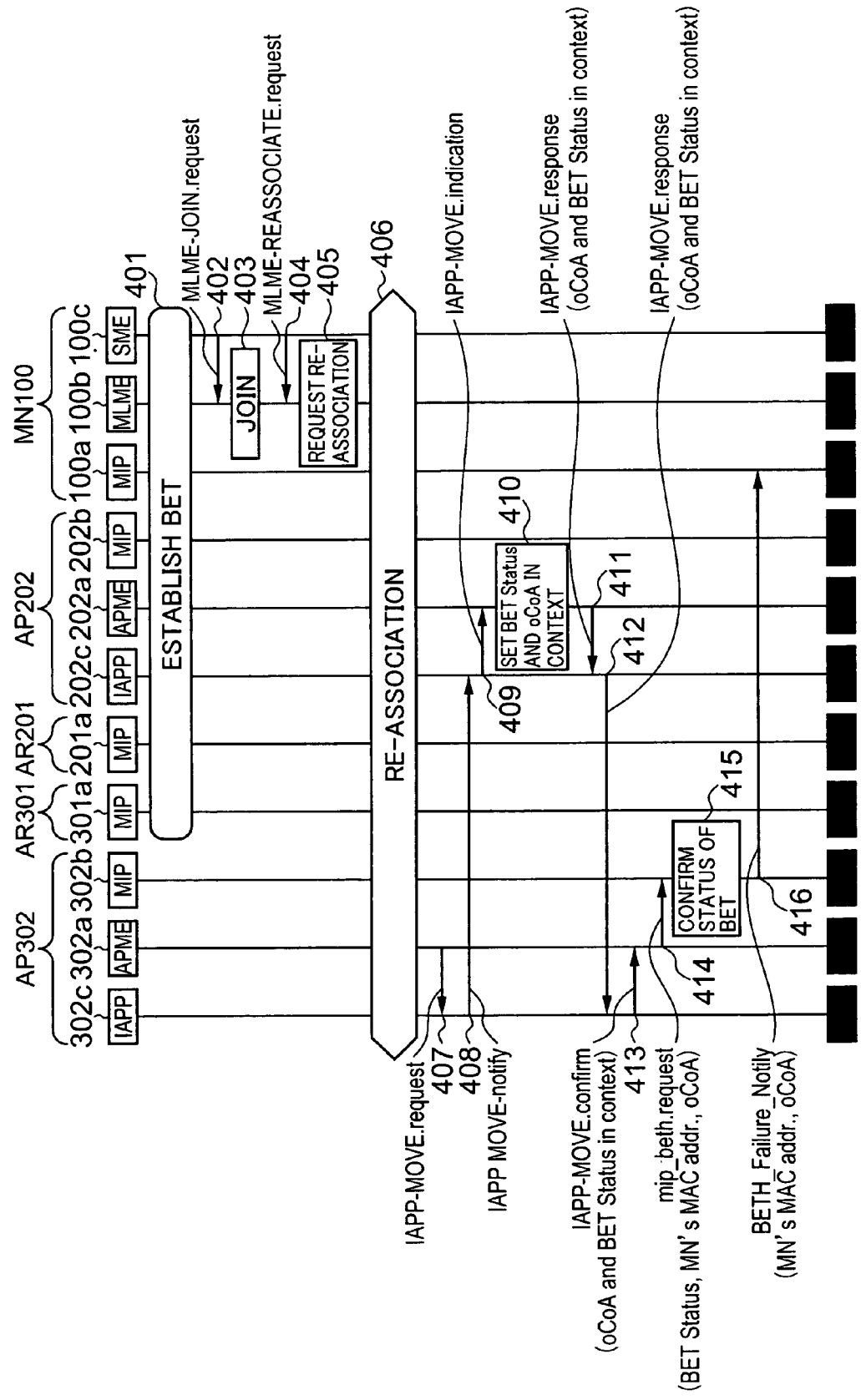
FIG. 4 is a flowchart showing the operation of a wireless communication system according to an embodiment 2 of the present invention.

Hereinafter, details of the present embodiment will be described with reference to FIG. 4. FIG. 4 is a flowchart showing the operation of a wireless communication system according to the embodiment 2 of the present invention. The same constituents in FIG. 4 as those in FIG. 3 are given the same symbols as used in FIG. 3, and detailed descriptions thereof are omitted.

As shown in FIG. 4, the AP 202 comprises, as functional elements, an IAPP section 202c which manages communication with other AP, in addition to the foregoing APME section 202a and MIP section 202b. The AP 302 has a similar constitution to that of the AP 202.

With reference to FIG. 4 in addition to FIG. 2, the overall operation of the wireless communication system according to the present embodiment will be described by use of a case where the MN 100 moves from the point A in the cell 203 to the point B in the cell 303 while having wireless communication as an example, as in the embodiment 1.

In STEP 401, establishment of a BET is implemented between the AR 201 and the AR 301. In the present embodiment, it is assumed that establishment of BETH was failed because the AR 301 does not support the BETH. It is needless to say that by the time the STEP 401 is carried out, the STEPS 301 to 305 in FIG. 3 described in the embodiment 1 are carried out and the AR 301 transmits a signal indicating that initiation of the BETH cannot be accepted to the AR 201.

Then, in STEP 402, the SME section 100c of the MN 100 transmits MLME-JOIN.request which is a primitive indicating a request for execution of "join" to the MLME section 100b. Receiving this primitive, the MLME section 100b executes "join" to the AP 302 in STEP 403. In STEP 404, the SME section 100c transmits MLME-REASSOCIATION.request which is a primitive indicating a request for execution of "re-association" to the MLME section 100b. Receiving this primitive, the MLME section 100b requests "re-association" to the AP 302 in STEP 405. As a result, in STEP 406, "re-association" is executed, whereby the MN 100 is connected to the subnetwork 300.

In STEP 407, the APME section 302a of the AP 302 transmits IAPP-MOVE.request which is a primitive indicating a request for execution of IAPP-MOVE to an IAPP section 302c. Receiving this primitive, the IAPP section 302c transmits IAPP-MOVE.notify which is a signal indicating a request for data about the MN 100 which did handover to the subnetwork 300 to the IAPP section 202c of the AP 202 in STEP 408. Since APs, i.e., the AP 302 and the AP 202 in this case, have unique IP addresses, they can communicate with each other directly. The IAPP-MOVE.notify includes, for example, data indicating the data length of the MAC address of the MN 100, the MAC address of the MN 100 and a context as parameters. The data length of this context is not particularly defined in IAPP.

Receiving the IAPP-MOVE.notify, the IAPP section 202c of the AP 202 transmits IAPP-MOVE.indication which is a primitive indicating that the IAPP section 202c received the IAPP-MOVE.notify from the AP 302 to the APME section 202a in STEP 409. Receiving this primitive, the APME section 202a acknowledges BET Status which is data indicating the status of a BET and MN's oCoA which is data indicating the care of address in the subnetwork 200 of the MN, as described in the embodiment 1 (more specifically, STEP 309 in FIG. 3). Thus, after the APME section 202a sets these BET Status and oCoA in the context in STEP 410, the APME section 202a transmits IAPP-MOVE.response which is a primitive including the set context to the IAPP section 202c in STEP 411.

Receiving this primitive, the IAPP section 202c transmits the IAPP-MOVE.response to the IAPP section 302c of the AP 302 in STEP 412. This IAPP-MOVE.response includes the same parameters as those included in the IAPP-MOVE.notify transmitted from the IAPP section 302c of the AP 302 in STEP 408. It is needless to say that BET Status and oCoA are set in the context.

Receiving the IAPP-MOVE.response, the IAPP section 302c transmits IAPP-MOVE.confirm which is a primitive indicating that it received this signal to the APME section 302a in STEP 413. This primitive includes BET Status and oCoA in the context of the IAPP-MOVE.response. Receiving this primitive, the APME section 302a transmits mip_beth.request which is a primitive indicating a request for confirmation of the status of a BET to the MIP section 302b in STEP 414. This primitive includes data (BET Status) indicating the status of establishment of the BET, the MAC address of the MN 100 and the care of address (oCoA) in the subnetwork 200 of the MN 100.

Receiving this primitive, the MIP section 302b checks the parameter in the mip_beth.request to confirm whether a BET was established between the AR 201 and the AR 301 in STEP 415. If the BET was not established, the MIP section 302b transmits BETH_Failure_Notify which is a signal indicating that establishment of the BET was failed to the MIP section 100a of the MN 100. Since the MIP section 302b of the AP 302 can know the care of address in the subnetwork 200 of the MN 100 from the parameter in the mip_beth.request, the MIP section 302b can transmit the signal indicating that establishment of the BET was failed, to the MN 100 assuming that the above care of address can still be used even in the subnetwork 300.

Receiving the BETH_Failure_Notify, the MN 100 becomes aware that the care of address in the subnetwork 200 can no longer be used. Thus, the MN 100 does not attach this care of address to packet data to be transmitted to a desired receiver. In other words, it can be prevented that the MN 100 performs the unnecessary operation. The MN 100 transmits packet data to a desired receiver after it acquires a care of address adapted to the subnetwork 300 from the AR 301.

Embodiment 3

In the present embodiment, a description will be given to prevention of the occurrence of delay in transmission and reception of packet by the MN when the MN does handover (BETH) to a third subnetwork after it does handover (BETH) from the first subnetwork to the second subnetwork and before it acquires a care of address adapted to the second subnetwork in the above embodiment 1.

Figure 5:
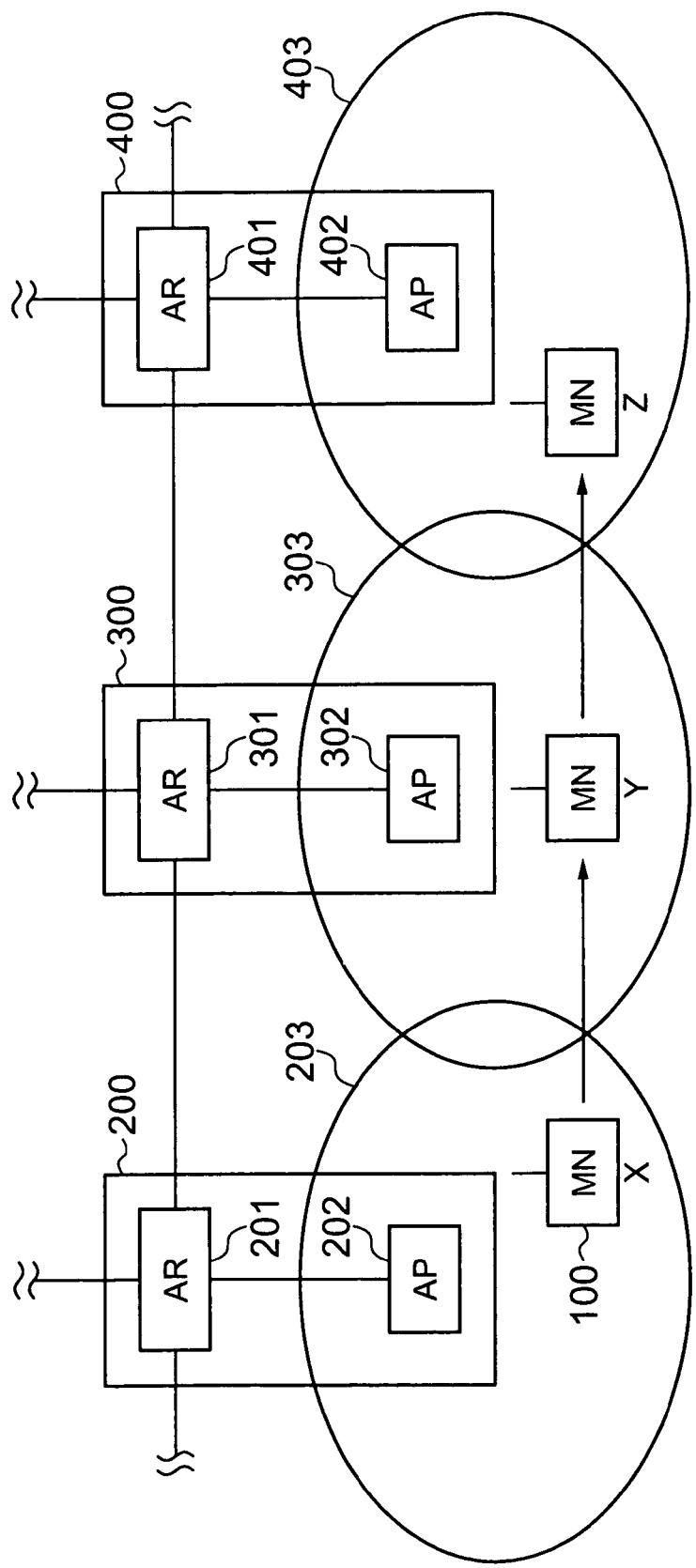
FIG. 5 is a schematic diagram showing the constitution of a wireless communication system according to an embodiment 3 of the present invention.

The occurrence of delay in transmission and reception of packet will be described more specifically with reference to FIG. 5. In FIG. 5, when the MN 100 moves from the point X in the cell 203 of the subnetwork 200 to the point Y in the cell 303 of the subnetwork 300, a BET is established between the AR 201 and the AR 301. In this state, the MN 100 still uses a care of address adapted to the subnetwork 200 until it acquires a care of address adapted to the subnetwork 300 from the AR 301.

Then, when the MN 100 moves to a point Z in a cell 403 of a subnetwork 400 before it acquires the care of address adapted to the subnetwork 300, a BET is established between the AR 301 and an AR 401. In this state, the MN 100 still uses the care of address adapted to the subnetwork 200 until it acquires a care of address adapted to the subnetwork 400. As a result, the MN 100 performs transmission and reception of packet by use of not only the BET established between the AR 301 and the AR 401 but also the BET established between the AR 201 and the AR 301. More specifically, since packet data transmitted from the MN 100 to a desired receiver is passed to the desired receiver via an AP 402, the AR 401, the AR 301 and the AR 201, delay occurs by the time this packet data is received by the desired receiver. Meanwhile, since packet data transmitted from a given transmitter to the MN 100 is passed to the MN 100 via the AR 201, the AR 301, the AR 401 and the AP 402, delay also occurs by the time this packet data is received by the MN 100.

Thus, in the present embodiment, to prevent the occurrence of such delay in transmission and reception of packet by the MN, a BET is established not between the AR 301 and the AR 401 but between the AR 201 and the AR 401. Hereinafter, details of the present embodiment will be described with reference to FIG. 6 in addition to FIG. 5.

FIG. 5 is a schematic diagram showing the constitution of a wireless communication system according to the embodiment 3 of the present invention. The same constituents in FIG. 5 as those in FIG. 2 are given the same symbols as used in FIG. 2, and detailed descriptions thereof are omitted. FIG. 5 shows the subnetwork 400 adjacent to the subnetwork 300 shown in FIG. 2. A detailed description of the constitution of the subnetwork 400 is omitted since it is similar to the constitution of the subnetwork 200 or subnetwork 300. It is needless to say that the subnetwork 400 is connected to the subnetwork 300 by connection of the AR 401 included in the subnetwork 400 to the AR 301 of the subnetwork 300.

Figure 6:
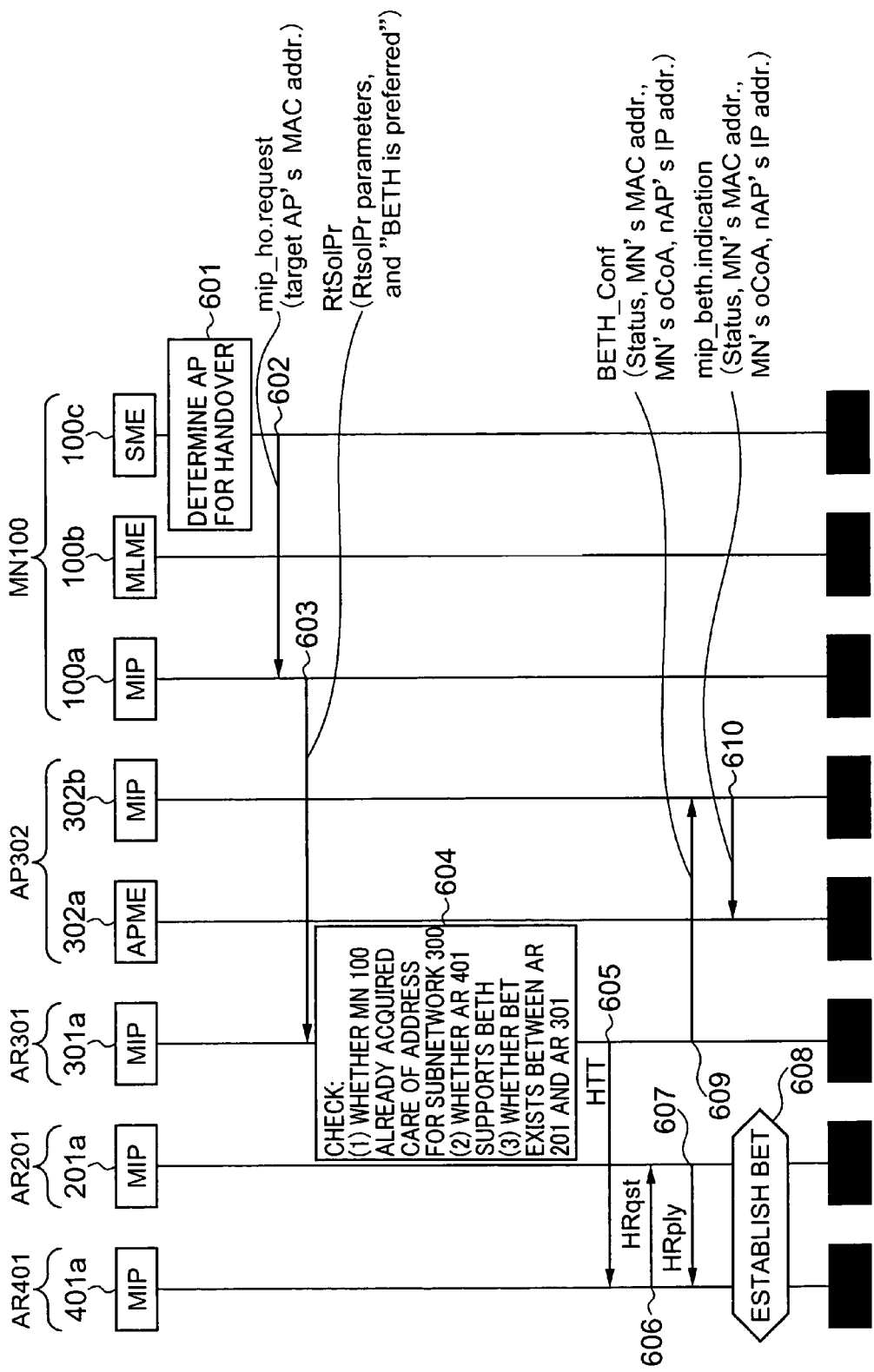
FIG. 6 is a flowchart showing the operation of the wireless communication system according to the embodiment 3 of the present invention.

FIG. 6 is a flowchart showing the operation of the wireless communication system according to the embodiment 3 of the present invention. The same constituents in FIG. 6 as those in FIG. 3 are given the same symbols as used in FIG. 3, and detailed descriptions thereof are omitted.

As shown in FIG. 6, the AR 401 has an MIP section 401a. The MIP section 401a has a similar constitution to that of the MIP section 301a of the AR 301 in FIG. 3. The AP 302 has an APME section 302a and an MIP section 302b. They have the same constitutions as those of the APME section 202a and the MIP section 202b in FIG. 3, respectively.

In the above example described by use of FIG. 5, when the MN 100 is present at the point Y in the cell 303, a BET is established between the AR 201 and the AR 301 by executing the same process as that described in the embodiment 1. The SME section 100c of the MN 100 selects the AP 402 as the next AP to which the MN 100 is connected in STEP 601. In STEP 602, the SME section 100c transmits mip_ho.request which is a primitive indicating a request for initiation of handover to the MIP section 100a. In STEP 603, the MIP section 100a transmits RtSolPr to the MIP section 301a of the AR 301. Details of these STEPS 602 and 603 are omitted since they correspond to STEPS 302 and 303 in FIG. 3, respectively.

Receiving the RtSolPr, the MIP section 301a of the AR 301 checks in STEP 604 whether the MN 100 has already acquired a care of address adapted to the subnetwork 300. Since it is the AR 301 that provides the care of address adapted to the subnetwork 300 to the MN 100, the MIP section 301a of the AR 301 can check whether the MN 100 already acquired the care of address. If the MN 100 already acquired the care of address, the above delay in transmission and reception of packet does not occur due to release of the BET established between the AR 201 and the AR 301. Thus, the same process as that described in the embodiment 1 is subsequently executed to establish a BET between the AR 301 and the AR 401.

If the MN 100 does not yet acquire the care of address, the MIP section 301a checks whether the AR 401 supports BETH so as to establish a BET between the AR 201 and the AR 401. If the AR 401 does not support the BETH, the above delay in transmission and reception of packet does not occur. Thus, usual FHO is subsequently implemented.

If the AR 401 supports the BETH, the MIP section 301a checks whether a BET exists between the AR 201 and the AR 301. If such a BET exists, the MIP section 301a transmits HTT (Handover to Third) which is a message for directing establishment of a BET not between the AR 301 and the AR 401 but between the AR 201 and the AR 401 to the MIP section 401a of the AR 401 in STEP 605.

Receiving this HTT message, the MIP section 401a of the AR 401 transmits HRqst which is a signal indicating a request for initiation of BETH to the MIP section 201a of the AR 201 in STEP 606. This HRqst is the same as that in STEP 305 in FIG. 3. In STEP 607, the MIP section 201a of the AR 201 transmits HRply which is a signal indicating acceptance of initiation of BETH to the MIP section 401a of the AR 401. Thereafter, in STEP 608, a BET is established between the AR 201 and the AR 401. As a result, after moving into the cell 403, the MN 100 can still use the previously acquired care of address adapted to the subnetwork 200 even in the subnetwork 400. Therefore, packet data transmitted from a given transmitter to the MN 100 is passed from the AR 201 to the AR 401 via the BET first and then passed to the MN 100 via the AP 402. Meanwhile, packet data transmitted from the MN 100 to a desired receiver (i.e., packet data with the care of address adapted to the subnetwork 200 attached thereto) is passed to the AR 401 via the AP 402 first, then passed from the AR 401 to the AR 201 via the BET, and then passed to the desired receiver.

Along with establishment of the BET, the MIP section 301a of the AR 301 transmits BETH_Conf which is a signal indicating that the BET was established between the AR 401 and the AR 201 to the MIP section 302b of the AP 302 in STEP 609. This BETH_Conf is the same as that in STEP 308 in FIG. 3. Receiving the BETH_Conf, the MIP section 302b transmits mip_beth.indication which is a primitive indicating data on BETH to the APME section 302a in STEP 610. This mip_beth.indication is the same as that in STEP 309 in FIG. 3.

As described above, in the present embodiment, when the MN does handover (BETH) to the third subnetwork after it does handover (BETH) from the first subnetwork to the second subnetwork and before it acquires a care of address adapted to the second subnetwork, the occurrence of delay in transmission and reception of packet by the MN can be prevented by establishing a BET between the AR of the third subnetwork and the AR of the first subnetwork in place of establishing a BET between the AR of the second subnetwork and the AR of the third subnetwork.

Embodiment 4

In the present embodiment, a description will be given to release of an established BET in the above embodiment.

There are some cases where a BET described in the above embodiment 1 must be released after the BET is established. For instance, as a first example, a case where a BET was established between the AR 201 and the AR 301 along with movement of the MN 100 from the point A in the cell 203 to the point B in the cell 303 in the wireless communication system shown in FIG. 2 is conceived. Thereafter, when the MN 100 acquires a care of address adapted to the cell 300, this BET is generally released. However, when the MN 100 returns into the cell 203 before it acquires the care of address, the BET must be released because it is no longer needed.

Next, as a second example, a case where a BET was established between the AR 201 and the AR 301 as in the above first example is conceived. Thereafter, as described in the embodiment 1, the MN 100 is connected to the subnetwork 300 by executing "re-association" between the AP 302 and itself. However, the MN 100 sometimes fails the "re-association" between the AP 302 and itself for some reason such as moving into a cell other than the cell 303. In this case as well, the BET established between the AR 201 and the AR 301 must be released.

Figure 7:
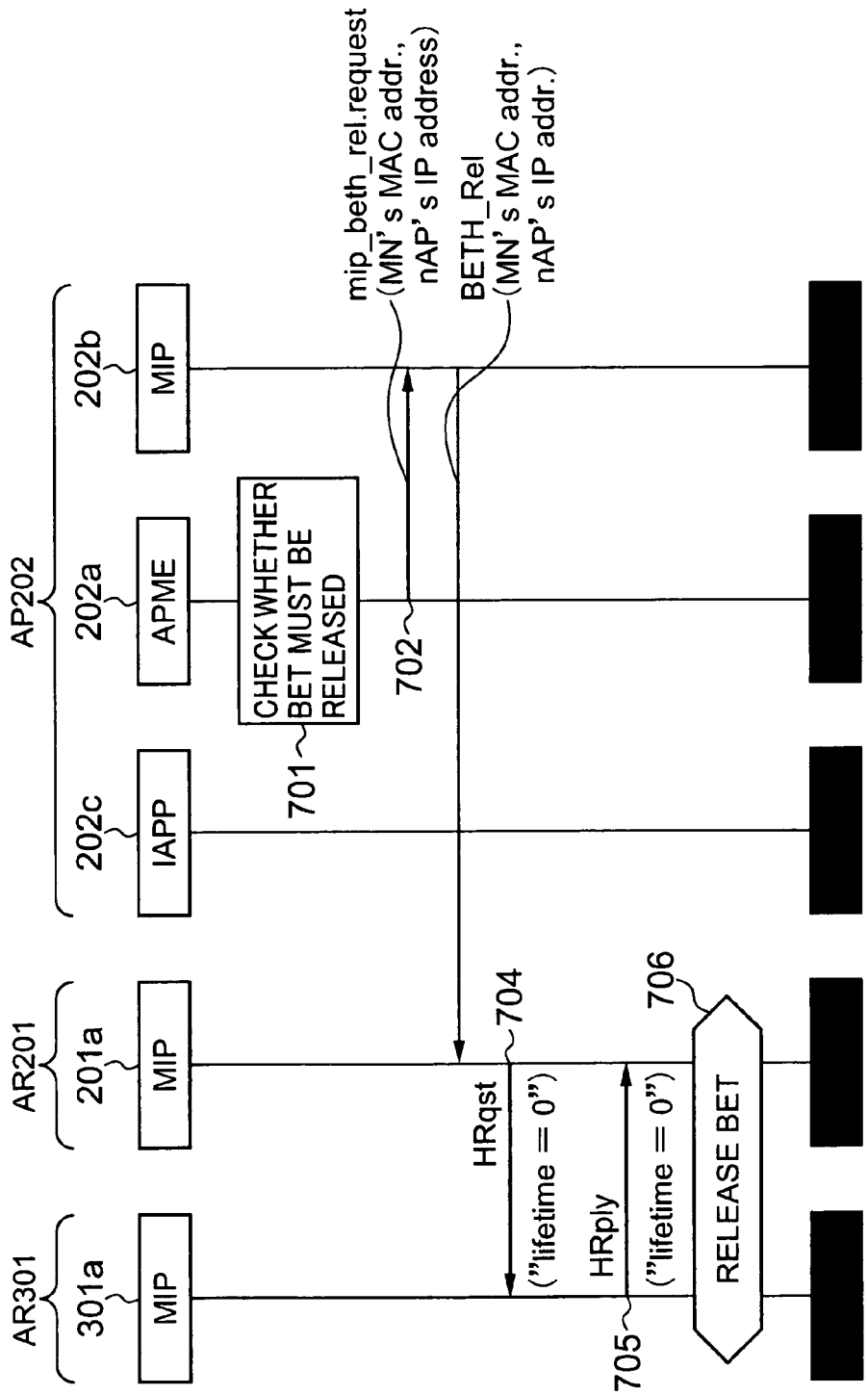
FIG. 7 is a flowchart showing the operation of a wireless communication system according to an embodiment 4 of the present invention.

Hereinafter, details of a wireless communication system according to the present embodiment will be described with reference to FIG. 7. FIG. 7 is a flowchart showing the operation of the wireless communication system according to the embodiment 4 of the present invention. The same constituents in FIG. 7 as those in FIG. 3 or 4 are given the same symbols as used in FIG. 3 or 4, and detailed descriptions thereof are omitted. It is assumed in this case as well that a BET is established between the AR 201 and the AR 301 by movement of the MN 100 from the point A in the cell 203 to the point B in the cell 303 as shown in FIG. 2.

In STEP 701, the APME section 202a of the AP 202 checks whether the established BET must be released. Firstly, when the APME section 202a cannot receive IAPP.MOVE-indication from the IAPP section 202c, it can acknowledge that the BET must be released. More specifically, if the MN 100 is securely connected to the subnetwork 300, the IAPP section 202c of the AP 202 receives IAPP-MOVE.notify which is a signal requesting data about the MN 100 from the AP 302 as shown in STEP 408 in FIG. 4, whereby the APME section 202a of the AP 202 receives IAPP.MOVE-indication from the IAPP section 202c. Further, the IAPP section 202c of the AP 202 acknowledges that the MN 100 was connected to the subnetwork 300 by receiving mip_beth.indication from the MIP section 202b of the AP 202 as shown in STEP 309 in FIG. 3. Accordingly, when the APME section 202a cannot receive the IAPP.MOVE-indication from the IAPP section 202c, it acknowledges that the MN 100 failed the "re-association" between the AP 302 of the subnetwork 300 and itself and determines that the BET must be released.

Secondly, when the APME section 202a acknowledges that a problem occurred in the L2 link between the MN to which it was supposed to be connected and itself by receiving IAPP-ADD.indication, it determines that the BET must be released. This primitive includes the MAC address of an MN (MN 100 in this case) which started association. The AP 202 can also determine whether the BET is to be released or not by a method other than these.

Determining that the BET must be released, the APME section 202a transmits mip_beth_rel.request which is a primitive indicating a request for release of the BET to the MIP section 202b in STEP 702. This primitive includes the MAC address of the MN 100 and the IP address of the AP 302 as parameters. Receiving the primitive, the MIP section 202b transmits BETH_Rel which is a signal indicating a request for release of the BET to the MIP section 201a of the AR 201 in STEP 703. This signal also includes the MAC address of the MN 100 and the IP address of the AP 302 as parameters.

Receiving the BETH_Rel, the MIP section 201a of the AR 201 transmits HRqst which is a signal indicating a request for initiation of BETH to the MIP section 301a of the AR 301 in STEP 704. The HRqst includes "lifetime" indicating the period of establishment of the BET as a parameter. The MIP section 201a can use the HRqst as a signal requesting release of the BET by setting the "lifetime" at 0. Receiving the HRqst, the MIP section 301a can indicate acceptance of release of the BET to the MIP section 201a by transmitting HRply in which "lifetime" is set at 0 to the MIP section 201a. As a result, the BET established between the AR 201 and the AR 301 can be released in STEP 706.

Embodiment 5

In the present embodiment, a description will be given to a case of determining whether a BET is to be released in a subnetwork to which an MN is connected, which is different from the above embodiment 4. In the above embodiment 4, it is determined in a subnetwork to which the MN was previously connected whether a BET established between the AR of the subnetwork to which the MN was previously connected and the AR of a subnetwork to which the MN is currently connected is to be released. However, in some cases, it is preferable to determine whether the BET is to be released in the subnetwork to which the MN is currently connected.

More specifically, as a first example, a case where a BET was established between the AR 201 and the AR 301 along with movement of the MN 100 from the point A in the cell 203 to the point B in the cell 303 in the wireless communication system shown in FIG. 2 is conceived. Thereafter, when the MN 100 ends communication, whether the BET is to be released is preferably determined not by the AP 202 of the subnetwork 200 but by the AP 302 of the subnetwork 300.

As a second example, when the MN 100 has done handover from the AP 302 of the subnetwork 300 to the AP of another subnetwork, the MN 100 transmits the above RtSolPr message (refer to STEP 303 in FIG. 3) to the AR 301, and the AR 301 transmits mip_beth.indication (refer to STEP 309 in FIG. 3) to the AP 302. Thus, in this case as well, whether the BET is to be released is preferably determined by the AP 302 of the subnetwork 300 which acknowledges the operation of the MN 100.

Hereinafter, details of a wireless communication system according to the present embodiment will be described with reference to FIG. 8. FIG. 8 is a flowchart showing the operation of the wireless communication system according to the embodiment 5 of the present invention. The same constituents in FIG. 8 as those in FIG. 3 or 4 are given the same symbols as used in FIG. 3 or 4, and detailed descriptions thereof are omitted. It is assumed in this case as well that a BET is established between the AR 201 and the AR 301 by movement of the MN 100 from the point A in the cell 203 to the point B in the cell 303 as shown in FIG. 2.

In STEP 801, the APME section 302a of the AP 302 checks whether the established BET must be released. Firstly, if the MN 100 is to end communication, the APME section 302a which releases the communication with the MN 100 can become aware that the BET must be released. Secondly, if the APME section 302a has received the IAPP-ADD.request primitive, it becomes aware that L2 level communication between the AP 302 and the MN 100 has been disconnected for some reason, so that the APME section 302a can become aware that the BET must be released. The AP 302 can also determine whether the BET is to be released by a method other than these.

Determining that the BET must be released, the APME section 302a transmits mip_beth_rel.request which is a primitive indicating a request for release of the BET to the MIP section 302b in STEP 802. This primitive includes the MAC address of the MN 100 and the IP address of the AP 202 as parameters.

Receiving the mip_beth_rel.request, the MIP section 302b transmits BETH_Rel which is a signal indicating a request for release of the BET to the MIP section 301a of the AR 301 in STEP 804. This signal also includes the MAC address of the MN 100 and the IP address of the AP 202 as parameters. Even when the MIP section 302b does not receive the mip_beth_rel.request, it still transmits the BETH_Rel to the MIP section 301a of the AR 301, if it can acknowledge that the AR 301 has received the RtSolPr message from the MN 100 (this can be acknowledged by mip_beth.indication shown in FIG. 3 as described above) as shown in STEP 803.

Receiving the BETH_Rel, the MIP section 301a of the AR 301 transmits HRqst which is a signal indicating a request for initiation of BETH to the MIP section 201a of the AR 201 in STEP 805. The HRqst includes "lifetime" indicating the period of establishment of the BET as a parameter. The MIP section 201a can use the HRqst as a signal requesting release of the BET by setting the "lifetime" at 0. Receiving the HRqst, the MIP section 201a can indicate acceptance of release of the BET to the MIP section 301a by transmitting HRply in which "lifetime" is set at 0 to the MIP section 301a. As a result, the BET established between the AR 201 and the AR 301 can be released in STEP 807.

Although the above embodiments have been described by use of the case using IEEE802.11 as a standard applied to between the MN and the AP as an example, the present invention is also applicable to a case using a standard equivalent to IEEE802.11 or an advanced version of IEEE802.11 which may be invented in the future between the MN and the AP. Similarly, although the above embodiments have been described by use of the case using Mobile IPv6 as an IP standard applied to between the MN and the AR as an example, the present invention is also applicable to a case using a standard equivalent to Mobile IPv6 or an advanced version of Mobile IPv6 which may be invented in the future between the MN and the AR.

The MN described in the above embodiments includes various mobile communication terminals such as a PHS, mobile telephone, handheld terminal, notebook personal computer and mobile personal computer which support communication based on the IEEE802.11 standard.

The access routers and access points included in the wireless communication system according to the present invention can be operated as described in detail in the above embodiments in accordance with a computer program. It is needless to say that such a computer program can be stored in various recording media including optical disks such as a CD, DVD and PD, magneto optical disks such as an MO and magnetic disks such as a hard disk, floppy disk and Zip.

What is claimed is:

1. A terminal comprising:
   a management entity configured to determine a next subnetwork to which the terminal will be in wireless communication next while the terminal is in wireless communication with a current subnetwork, and
   a transmitter configured to transmit data to a router of the current subnetwork via layer 3 level communication, the data indicating the determined next subnetwork and a request for establishing a bidirectional edge tunnel between a router of the next subnetwork and the router of the current subnetwork, the data being transmitted while the terminal is present in a communicatable range of the current subnetwork, the request being for making the router of the current subnetwork, in response to receiving the request, initiate establishment of the bidirectional edge tunnel between the router of the next subnetwork and the router of the current subnetwork, wherein the current subnetwork and the next subnetwork are foreign networks.

2. The terminal as in claim 1, wherein if the bi-directional edge tunnel cannot be established, the terminal is configured to receive a care-of-address adapted to the next subnetwork when a fast handover procedure is implemented to establish communications with the next subnetwork.

3. The terminal as in claim 1, wherein the terminal further comprises a management function to manage data on handover of the terminal.

4. The terminal as in claim 1, wherein the terminal further comprises an acquisition function to acquire a care-of-address adapted to the current subnetwork from the router of the current subnetwork.

5. The terminal as in claim 1, further comprising a medium access control layer management entity configured to provide a request for execution of a join to the management entity which is configured to determine the next subnetwork and, in response to the request for execution of the join, the management entity is configured to execute join to the next subnetwork.

6. A method comprising:
   communicating, by a router, with an intermediary device that is within a communicatable range of a terminal configured to wirelessly communicate with the intermediary device, the router and the intermediary device being in a current subnetwork of the terminal,
   routing, via the router, a data signal between the terminal and a communication network, receiving, by the router, an indication of a next subnetwork to which the terminal will be in wireless communication with next, the indication being received via layer 3 level communication and including a request from the terminal for establishing a bidirectional edge tunnel, and in response to the router receiving the request, initiating establishment of the bidirectional edge tunnel between a router of the next subnetwork and the router in the current subnetwork, wherein the current subnetwork and the next subnetwork are foreign networks.

7. The method as in claim 6, wherein the router of the current subnetwork is configured to establish the bidirectional edge tunnel after the terminal determines the next subnetwork and while the terminal is in communication with the router of the current subnetwork.

8. The method as in claim 7, wherein the router of the current subnetwork is configured to establish the bidirectional edge tunnel after the terminal determines the next subnetwork and before the terminal is in wireless communication with the intermediary device of the next subnetwork.

9. The method as in claim 6, further comprising:
performing a fast handover procedure, if the router in the current subnetwork fails to establish the bidirectional edge tunnel.

10. The method as in claim 6, further comprising notifying the intermediary device of the next subnetwork of a status of the establishment of the bidirectional edge tunnel implemented by the router of the current subnetwork and an interne protocol address adapted to the current subnetwork of the terminal.

11. The method as in claim 6, wherein the router of the current subnetwork having a bidirectional edge tunnel established with a router of a previous subnetwork to which the terminal has been in wireless communication is configured to direct the router of the next subnetwork to establish a bidirectional edge tunnel between the router of the next subnetwork and the router of the previous subnetwork.

12. The method as in claim 6, wherein the intermediary device comprises:
a determination device configured to determine whether the bidirectional edge tunnel established by the router with a router of the next subnetwork is to be released, wherein
the router being in wireless communication with the intermediary device is configured to release the established bidirectional edge tunnel according to a result of the determination.

13. The method as in claim 6, further comprising
upon establishment of the bidirectional edge tunnel between the router of the next subnetwork and the router in the current subnetwork, notifying the intermediary device of the current subnetwork of a status of the establishment of the bidirectional edge tunnel.

14. A method comprising:
determining, via a management entity of a terminal, a next subnetwork to which the terminal will be in wireless communication next while the terminal is in wireless communication with a current subnetwork, and
transmitting, via a transmitter of the terminal to a router of the current subnetwork via layer 3 level communication, data indicating the determined next subnetwork and data indicating a request for establishing a bidirectional edge tunnel between a router of the next subnetwork and the router of the current subnetwork, the data being transmitted while the terminal is present in a communicatable range of the current subnetwork, the request being for making the router of the current subnetwork, in response to receiving the request, to initiate establishment of the bidirectional edge tunnel between the router of the next subnetwork and the router of the current subnetwork, wherein the current subnetwork and the next subnetwork are foreign networks.

15. The method as in claim 14, further comprising, if the bi-directional edge tunnel cannot be established, receiving, at the terminal, a care-of-address adapted to the next subnetwork after a fast handover procedure is implemented to establish communications with the next subnetwork.

16. The method as in claim 14, further comprising managing data on handover of the terminal via a management function.

17. The method as in claim 14, further comprising acquiring a care-of-address adapted to the current subnetwork via an acquisition function.

18. The method as in claim 14, further comprising requesting execution of a join to the management entity, via a medium access control layer management entity, to determine the next subnetwork and, in response to the request execution of the join, and executing, via the management entity, the request to join to the next subnetwork.

19. A router comprising:
an interface configured to communicate with an intermediary device that is within a communicatable range for wireless communication between a terminal and the intermediary device, the router and the intermediary device being in a current subnetwork of the terminal, and
an allocator for allocating a care-of-address adapted to the current subnetwork, wherein the router is configured:
to route a data signal between the terminal configured to wirelessly communicate with the intermediary device and a communication network,
to receive data, via layer 3 level communication, indicating a next subnetwork to which the terminal will be in wireless communication with next said received data including a request from the terminal for establishing a bidirectional edge tunnel, and,
in response to the router receiving the request, to initiate establishment of the bidirectional edge tunnel with a router of the next subnetwork, wherein the current subnetwork and the next subnetwork are foreign networks.

20. The router of claim 19, wherein the router of the current subnetwork is configured to establish the bidirectional edge tunnel after the terminal determines the next subnetwork and while the terminal is in communication with the router of the current subnetwork.

21. The router of claim 19, wherein the router of the current subnetwork is configured to establish the bidirectional edge tunnel after the terminal determines the next subnetwork and before the terminal is in wireless communication with the intermediary device of the next subnetwork.

22. The router of claim 19, wherein, if the router in the current subnetwork fails to establish the bidirectional edge tunnel, the router is configured to perform a fast handover procedure.

23. The router of claim 19, wherein the router further configured to notify the intermediary device of the next subnetwork of a status of the establishment of the bidirectional edge tunnel implemented by the router of the current subnetwork and an internet protocol address adapted to the current subnetwork of the terminal.

24. The router of claim 19, wherein the router of the current subnetwork having a bidirectional edge tunnel established with the router of a previous subnetwork to which the terminal has been in wireless communication is configured to direct the router of the next subnetwork to establish a bidirectional edge tunnel between the router of the next subnetwork and the router of the previous subnetwork.

25. The router of claim 19, wherein the router comprises an access router according to Mobile Ipv6.

* * * * *